United States Patent [19]
Robinson et al.

[11] Patent Number: 5,874,157
[45] Date of Patent: Feb. 23, 1999

[54] SEPARABLE LAMINATED PAPER PRODUCT

[75] Inventors: Douglas Edgar Robinson, Koenigstein, Germany; Michael Bernard Dugas, Wyoming; Barry Robert Silber, Cincinnati, both of Ohio

[73] Assignee: The Procter & Gamble Company, Cincinnati, Ohio

[21] Appl. No.: 626,401

[22] Filed: Apr. 2, 1996

[51] Int. Cl.⁶ .................................................. B32B 9/00
[52] U.S. Cl. ........................ 428/194; 428/195; 428/211; 428/212; 428/906
[58] Field of Search .................................. 428/153, 154, 428/172, 195, 198, 211, 194, 212, 906

[56] References Cited

U.S. PATENT DOCUMENTS

| | | | |
|---|---|---|---|
| 3,414,459 | 12/1968 | Wells | 161/131 |
| 3,511,746 | 5/1970 | Davies | 161/147 |
| 3,514,355 | 5/1970 | Welin-Berger | 156/291 |
| 3,556,907 | 1/1971 | Nystrand | 156/470 |
| 3,673,060 | 6/1972 | Murphy et al. | 161/126 |
| 3,867,225 | 2/1975 | Nystrand | 156/209 |
| 5,143,776 | 9/1992 | Givens | 428/194 |
| 5,294,475 | 3/1994 | McNeil | 428/154 |
| 5,415,918 | 5/1995 | Lang et al. | 428/154 |

FOREIGN PATENT DOCUMENTS

| | | | |
|---|---|---|---|
| WO 94/12343 | 6/1994 | WIPO . | |
| WO 94/29524 | 12/1994 | WIPO | D21H 23/58 |

*Primary Examiner*—Marion McCamish
*Assistant Examiner*—Elizabeth M. Cole
*Attorney, Agent, or Firm*—Edward J. Milbrada; Larry L. Huston; E. Kelly Linman

[57] ABSTRACT

An embossed paper laminate having two laminae is provided. The laminae are joined such that there is at least one zone of the laminate wherein the peel strength of the laminate in that zone is greater than the peel strength of the laminate in other zones of the laminated paper product. The laminate is made by two close tolerance pattern rolls juxtaposed to form a nip. Each pattern roll has radially extending protuberances which contact the periphery of the other pattern roll intermediate its protuberances. The laminae are fed through the nip in face-to-face relationship and are embossed and adhesively joined to the other lamina by the radially extending protuberances. The laminating adhesive is supplied to the various zones of the laminated paper product at a level that is appropriate for providing the requisite peel strength for that zone.

7 Claims, 3 Drawing Sheets

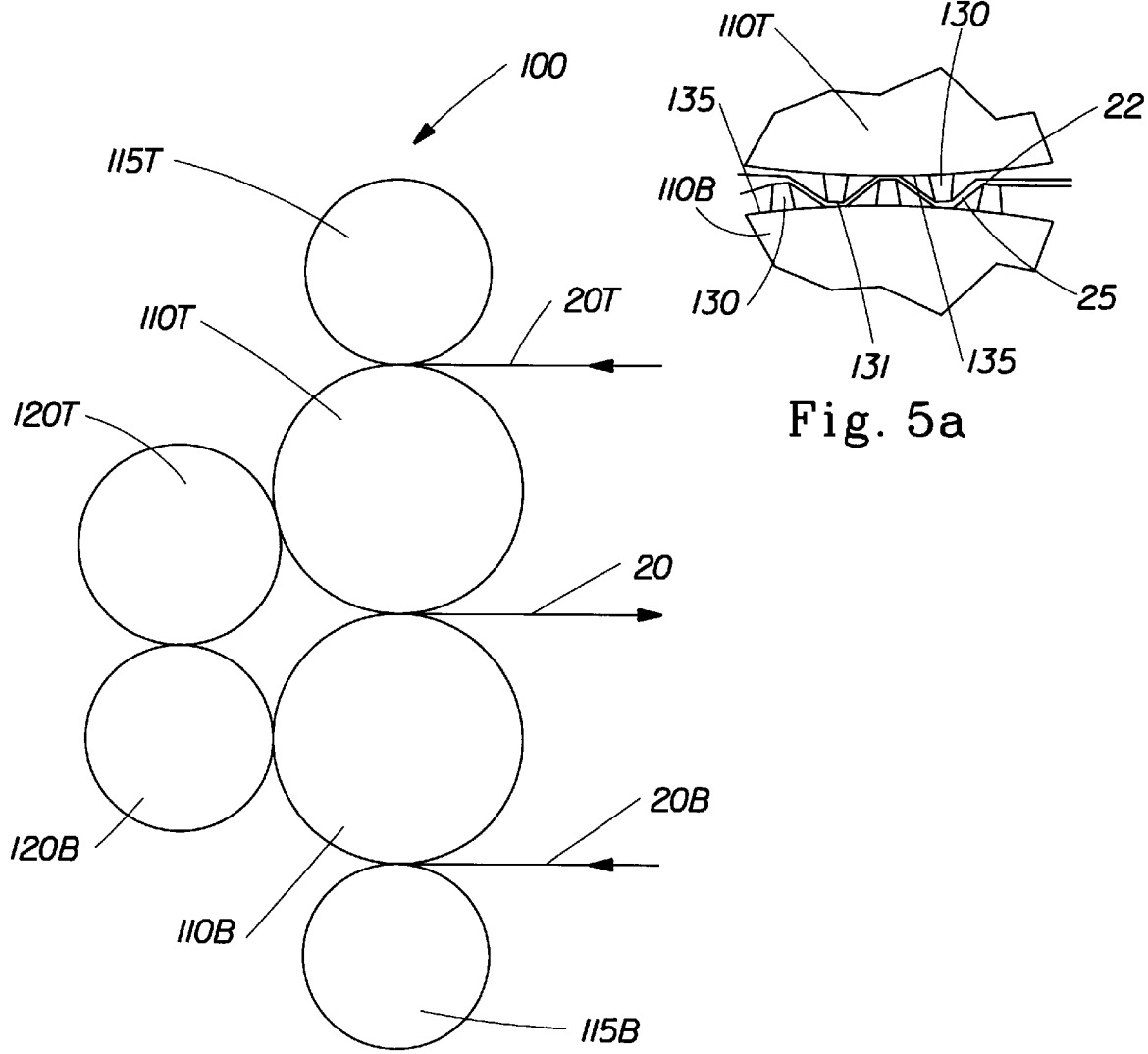
Fig. 5a
Fig. 5
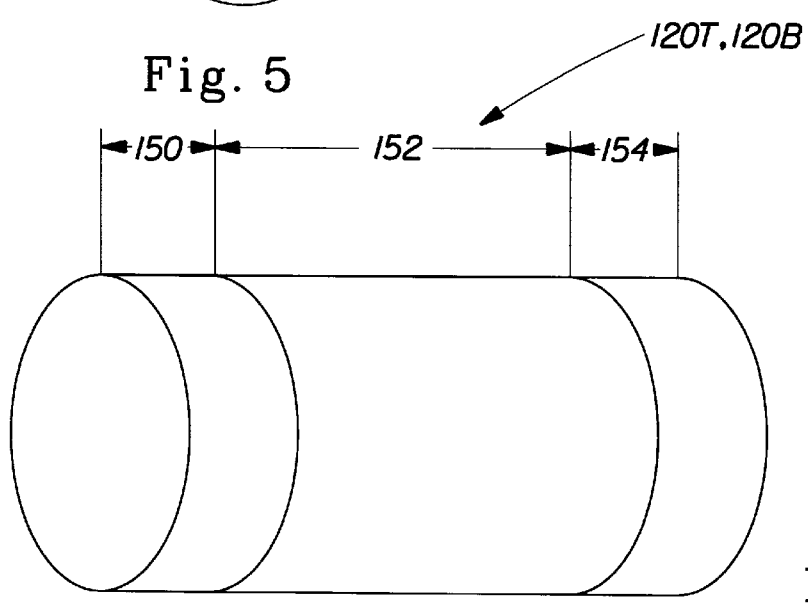
Fig. 6

SEPARABLE LAMINATED PAPER PRODUCT

FIELD OF THE INVENTION

The invention described herein relates to laminated paper products useful as toweling, toilet tissue, napkins, and the like. Specifically, this invention relates to laminated paper products wherein the lamina of the lamination can be controllably separated.

BACKGROUND OF THE INVENTION

Laminated paper products, particularly laminated tissue products, have long been available to meet consumer needs for absorbency (e. g. paper towels for spill cleanup), sanitation (e. g. toilet tissue) and protection (e. g. paper napkins). Over the years, these consumer needs have directed the art toward optimization of specific properties in such products to meet specific needs. For example, U.S. Pat. No. 4,603,176, issued to Bjorkquist, et al. on Jul. 29, 1986 discloses temporary wet strength resins suitable for use in toilet tissue so the tissue remains strong during use but still readily disintegrates in sewage disposal systems. Similarly, U.S. Pat. No. 3,414,459 issued to Wells on Dec. 3, 1968 describes a compressible, laminated paper structure that has enjoyed wide commercial acceptance as a paper towel because of its excellent softness and absorbency and U.S. Pat. No. 3,673,060 issued to Murphy, et al. on Jun. 27, 1972 discloses laminated, creped tissue products said to possess improved softness useful as dinner napkins.

While each of these various types of products can also be used to meet consumer needs better met by a product optimized for that need, they still only partially meet those non-targeted needs. For example, several paper napkins may be required to wipe up a spill that could be wiped up by only one sheet of paper toweling. Conversely, several sheets of paper toweling may be required to provide the area coverage of one paper napkin. It is therefore an object of this invention to provide paper products designed to meet more than one consumer need. It is a further object of this invention to provide paper products which can be used as either a paper towel or as a paper napkin. Finally, it is an object of this invention to provide laminated paper products that possess the strength, absorbency and softness properties of a paper towel while, at the same time, meeting the softness and area coverage requirements of the paper napkin user more readily than currently available paper towels.

Other objects and advantages of the present invention will become apparent by reference to the following description and the accompanying drawings.

SUMMARY OF THE INVENTION

The present invention preferably comprises a laminated paper product having two outer faces and comprising first and second laminae. The laminae are joined in face-to-face relationship. Each lamina has an inner face oriented towards the other lamina and an outer face opposed thereto. Each of the two laminae comprises a nonembossed region and embossed sites projecting towards the other lamina. Preferably, a plurality of the embossed sites of each of the laminae are adhesively joined to the nonembossed region of the opposing lamina. Alternatively, at least portions of the laminae can be joined by interlocking of the embossed sites. The laminated paper product of the present invention further comprises zones of differing peel strength. An integrity maintenance zone, with a peel strength higher than the peel strength in a separation zone, allows the laminae of the laminated paper product to be partially separated while the laminated paper product remains a unitary article. A starting zone is also provided allowing a user to initiate the separation of the laminae.

The invention further comprises an apparatus and a method for producing such a laminated paper product. The method comprises the steps of providing two pattern rolls having radially oriented protuberances extending therefrom and juxtaposed in an axially parallel relationship to form a nip therebetween. The distal ends of the protuberances of each roll contact the periphery of the other said roll. Two laminae are provided and forwarded through this nip in face-to-face relationship, whereby discrete embossed sites are formed by the protuberances. Adhesive is applied to a plurality of the embossed sites according to the required peel strength for that zone of the laminated paper product. Each lamina is adhesively joined to the other at the embossed sites.

BRIEF DESCRIPTION OF THE DRAWINGS

While the Specification concludes with claims particularly pointing out and distinctly claiming the present invention, it is believed the same will be better understood by the following Specification taken in conjunction with the associated drawings in which like components are given the same reference numeral, and:

FIG. 5 is a side elevational view of the adhesive applicator rolls of an apparatus for making the laminated paper product of the present invention.

FIG. 5A is an enlarged side elevational view of the nip between the rolls of FIG. 5.

FIG. 6 is a perspective view of one of the adhesive applicator rolls.

DETAILED DESCRIPTION OF THE INVENTION

In general, the laminated paper product of the present invention comprises at least two lamina of paper. Preferably this paper is the thin, relatively low basis weight paper, known commonly as tissue paper. These larnina can be separably joined, as described hereinbelow, to provide the paper product of the present invention. As used herein, the term "separably joined" means that the laminae of the present invention are joined with a peel strength that is sufficiently great for the laminated paper product of the present invention to be used in its unseparated state without separation of the lamina during use yet low enough that, if a user chooses, at least a portion of the lamina can be separated by the user with minimal effort without destroying the laminae.

It has been discovered that paper products that are separably joined can meet the needs of both a paper towel user and the needs of a paper napkin user with one article.

Specifically, when the product of the present invention is used in its unseparated state it possesses the strength, softness and absorbency of a paper towel. In the separated state, the product provides the softness and area coverage needed by a paper napkin. Thus, laminated paper products of the present invention are able to meet the needs of both paper towel users and paper napkin users.

Figure 1:
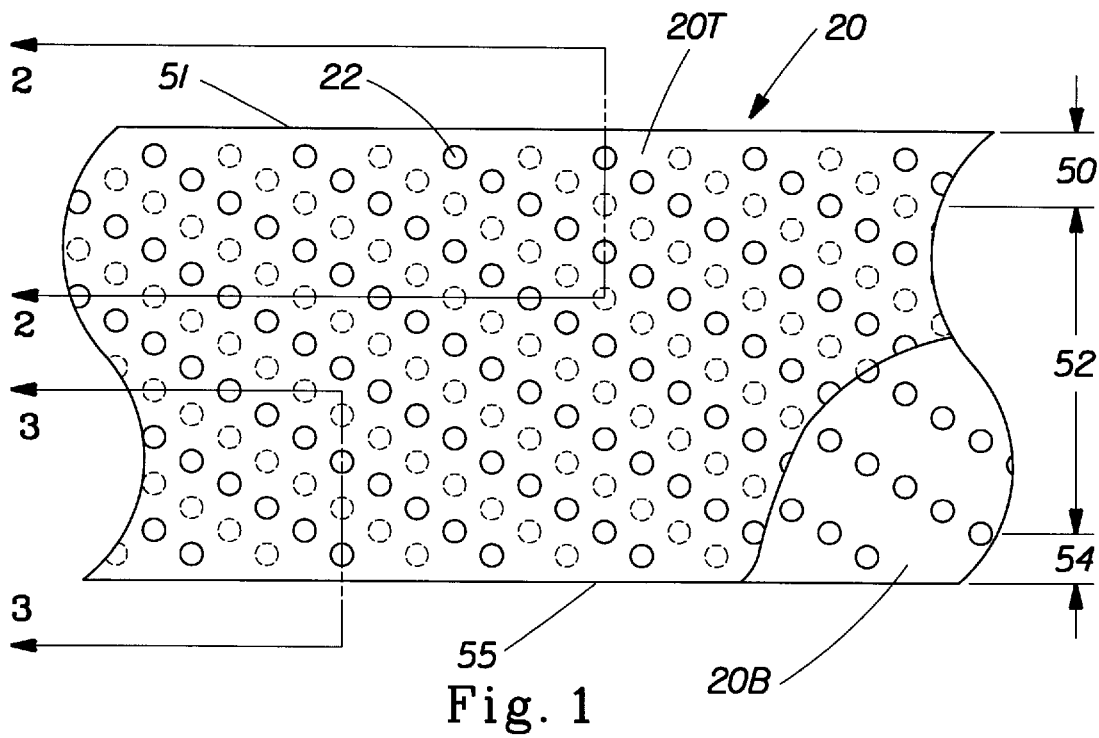
FIG. 1 is a top plan view of a preferred embodiment of the laminated paper product of the present invention, shown partially cut away.
Figure 4:
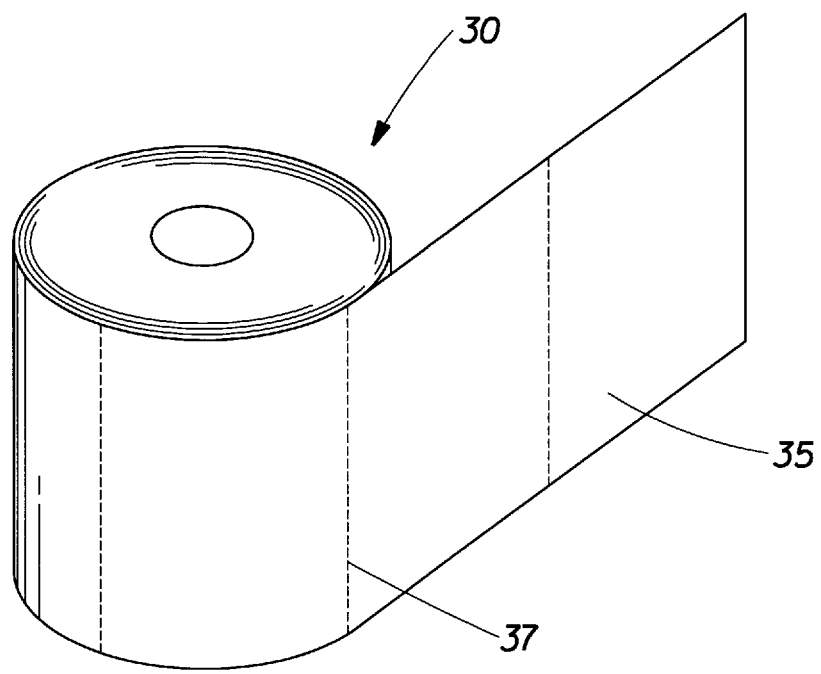
FIG. 4 is a perspective view of a particularly preferred embodiment of the laminated paper product of the present invention.

FIG. 1 shows a plan view of a preferred embodiment of the laminated paper product 20 of the present invention. The laminated paper product 20 according to the present invention comprises two laminae 20T and 20B joined in face-to-face relation. The laminated paper product 20 has three distinct zones, an integrity maintenance zone 50, a separation zone 52, and a starting zone 54, and first and second longitudinal edges 51 and 55. As used herein, the term "longitudinal" is intended to describe a direction parallel to the long edge of a web of material that can be wound into roll form as is shown in FIG. 4 and the terms "lateral" or "transverse" are intended to describe a direction that is orthogonal to the longitudinal direction. The laminae 20T and 20B further comprise embossed sites 22 projecting generally outward therefrom and preferably orthogonal thereto. The laminated paper product 20 is, preferably, composed of cellulosic fibers approximated by linear elements.

The cellulosic fibers that are components of the laminated paper product 20 have one relatively large dimension (along the longitudinal axis of the fiber) compared to the other two relatively very small dimensions (mutually perpendicular, and being both radial and perpendicular to the longitudinal axis of the fiber), so that linearity is approximated. While microscopic examination of the fibers may reveal two other dimensions which are small, compared to the principal dimension of the fibers, such other two small dimensions need not be substantially equivalent nor constant throughout the axial length of the fiber. It is only important that the fiber be able to bend about is axis, be able to bond to other fibers and be distributed by a liquid carrier or by air.

The fibers comprising the laminated paper product 20 may be synthetic, such as polyolefin or polyester; are preferably cellulosic, such as cotton linters, rayon or bagasse; and more preferably are wood pulp, such as soft woods (gymnosperms or coniferous) or hard woods (angiosperms or deciduous). As used herein, a laminated paper product 20 is considered "cellulosic" if the laminated paper product 20 comprises at least about 50 weight percent or at least about 50 volume percent cellulosic fibers, including but not limited to those fibers listed above. A cellulosic mixture of wood pulp fibers comprising softwood fibers having a length of about 2.0 to about 4.5 millimeters and a diameter of about 25 to about 50 micrometers, and hardwood fibers having a length of less than about 1 millimeter and a diameter of about 12 to about 25 micrometers has been found to work well for the laminated paper products 20 described herein.

If wood pulp fibers are selected for the laminated paper product 20, the fibers may be produced by any pulping process including chemical processes, such as sulfite, sulfate and soda processes; and mechanical processes such as stone groundwood. Alternatively, the fibers may be produced by combinations of chemical and mechanical processes or may be recycled. The type, combination, and processing of the fibers used are not critical to the present invention. The hardwood and softwood fibers may be layered throughout the thickness of the laminated paper product 20.

A laminated paper product 20 according to the present invention is macroscopically two-dimensional and planar, although not necessarily flat. The laminated paper product 20 does have some thickness in the third dimension. However, the third dimension is relatively small compared to the actual first two dimensions or to the capability to manufacture a laminated paper product 20 having relatively large measurements in the first two dimensions.

The laminated paper product 20 according to the present invention comprises a laminate of two individual laminae 20T and 20B. A "lamina" is taken off the forming element of a papermaking machine as a single sheet having a thickness prior to drying which does not change unless fibers are added to or removed from the sheet. The basis weight of each lamina 20T and 20B can range from about 9 pounds per 3000 square feet to about 30 pounds per 3000 square feet, preferably about 10 pounds per 3000 square feet to about 20 pounds per 3000 square feet. Each lamina 20T or 20B is joined to the other lamina 20B or 20T. It is to be understood that each lamina 20T or 20B may be directly joined to the opposite lamina 20B or 20T, or, may be connected through an intermediate layer, if desired, interposed between the laminae 20T and 20B.

As shown in FIG. 1, the lamina 20T and 20B of the preferred embodiment of the laminate paper product 20 are joined in two discrete zones. The lamina 20T and 20B are securely joined in the integrity maintenance zone 50. As the name implies, the integrity maintenance zone 50 is intended to maintain the integrity of the laminated paper product 20 when a user manipulates the laminated paper product from its unseparated state to its separated state. That is, the laminated paper product 20 should remain joined in the integrity maintenance zone 50 even after a user has separated the laminae in the separation zone 52. The lamina 20T and 20B are separably joined in the separation zone 52. That is, a user can manipulate the laminated absorbent article 20 from its unseparated state to its separated state by disrupting the attachment means joining the lamina 20T and 20B in the separation zone 52.

Figure 2:
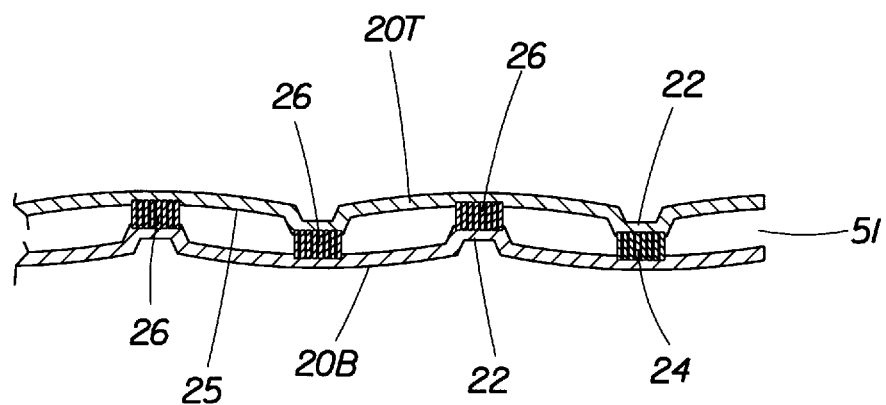
FIG. 2 is an enlarged sectional view of a preferred embodiment of the laminated paper product of the present invention taken along lines 2—2.
Figure 3:
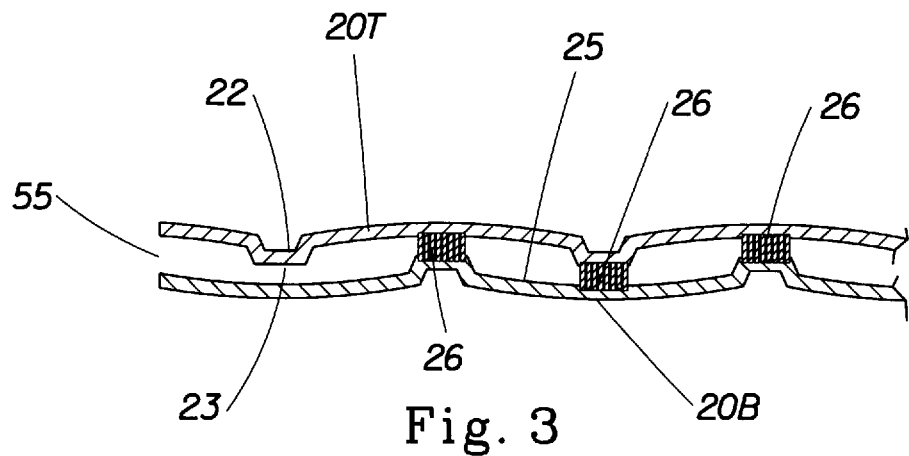
FIG. 3 is an enlarged sectional view of a preferred embodiment of the laminated paper product of the present invention taken along lines 3—3.

In the preferred embodiment of the laminated paper product 20 shown in FIGS. 1—3, the integrity maintenance zone 50 is located adjacent the first longitudinal edge 51 of the laminated paper product 20. The integrity maintenance zone 50 should only be as wide as is necessary to insure that the lamina 20T and 20B remain reliably joined when the laminated paper product 20 is in its separated state. The Applicants have found that a lateral width greater than about 0.0625 inches (0.16 cm) will provide such reliable attachment. Preferably, the lateral width is greater than about 0.25 inches (0.64 cm). More preferably, the width is about 0.375 inches (0.95 cm). If the width of the integrity maintenance zone 50 is too wide, the laminated paper product 20 is aesthetically unappealing and of lesser utility in its separated state. That is much of the advantage of using the laminated paper product in its separated state can be lost. A width of greater than about 0.625 inches (1.59 cm) has been found to be unacceptably wide.

As shown in FIG. 1, the separation zone 52 is located laterally intermediate the integrity maintenance zone 50 and the starting zone 54. The width of the separation zone 52 is determined by the desired width of the laminated paper product 20 since the width of this zone 52 comprises the bulk of the width of the laminated paper product 20.

In the preferred embodiment 20 of FIGS. 1–3 the laminae 20T and 20b are joined at the embossed sites 22. As is shown in FIGS. 2 and 3, the distal end 23 of an embossed site 22 projects towards and can be joined to the nonembossed region 25 of the opposite lamina 20T or 20B. The distal ends 23 can be joined to the nonembossed region 25 using attachment means 24 or 26. By controlling the relative peel strengths of the attachment means 24 and 26, the separability of the lamination can be controlled. As used herein, the term "separability" means the degree of difficulty or the force per unit width necessary to divide the laminate into separate laminae 20T, 20B.

The embossed sites 22 of each lamina 20T or 20B represent discrete regions of relatively high density, due to the compaction of the fibers which occurs during embossing. As used herein "embossing" refers to the process of deflecting a relatively small portion of a cellulosic fibrous structure normal to its plane and impacting the projected portion of the cellulosic fibrous structure against a relatively hard surface to permanently disrupt the fiber to fiber bonds. Embossing results in a permanent localized deformation of the embossed site 22 so deflected. The embossed sites 22 project normal to the plane of the lamina 20T or 20B and towards the opposite lamina 20B or 20T.

The embossed sites 22 of the laminated paper product 20 are arranged in a nonrandom repeating pattern corresponding to the topography of the apparatus, discussed hereinbelow, used to manufacture the laminated paper product 20. Preferably the nonrandom repeating pattern tessellates, so that adjacent embossed sites 22 are cooperatively and advantageously juxtaposed. By being "nonrandom," the embossed sites 22 are considered to be in a predictable disposition and may occur as a result of known and predetermined features of the manufacturing process. As used herein, "repeating" means the pattern is formed more than once in the laminated paper product 20. By being "discrete," the adjacent embossed sites 22 are not contiguous.

As used herein the "essentially continuous" nonembossed region 25 extends substantially throughout the fibrous structure in one or both of its principal directions. The essentially continuous nonembossed region 25 has a lesser density than the embossed sites 22, since the essentially continuous nonembossed region 25 is not compacted in the embossing process. The density of the essentially continuous nonembossed region 25 approximates the density of the discrete embossed sites 22 prior to being embossed.

The foregoing discussion is not intended to limit the scope of the present invention solely to embodiments wherein the embossed sites 22 are joined to nonembossed regions 25 to form the laminated paper structure 20 of the present invention. For example, the laminae 20T and 20B could be joined at the mated distal surfaces 23 of the embossed sites 22 as is taught in U.S. Pat. No. 3,414,459 entitled "Compressible Laminated Paper Structure" which was issued to Wells on Dec. 3, 1968, the disclosure of which patent is incorporated herein by reference. Embodiments wherein the laminae 20T and 20b are joined in the separation zone 52 solely by mechanical interlocking of the embossed sites 22 are also considered part of the scope of the present invention. Other means of joining the laminae 20T and 20B that do not require embossed sites, such as by strips of adhesive or other means as would be familiar to those skilled in the art are also envisioned.

The laminae 20T and 20B are joined using attachment means 24 and 26. Integrity attachment means 24 is intended to insure the laminated paper product 20 remains a unitary article when the laminae 20T and 20B have been partially separated by a user. As used herein, the term "unitary article" means an article which remains a coordinated entity even when the elements which comprise the article are manipulated by a user to a state different from the state of the article was in when received by the user. That is, integrity attachment means 24 is intended to insure that a user does not divide the laminated paper product 20 into individual laminae 20T and 20B when manipulating it from its unseparated state into its separated state. Peelable attachment means 26 is intended to maintain the laminated paper product 20 in its unseparated state until it is intentionally manipulated by a user into its separated state.

As is obvious to one skilled in the lamination art, integrity attachment means 24 will, of necessity, have a greater peel strength than peelable attachment means 26. As used herein, the term "peel strength" means the force per unit width required to separate lamina 20T and 20B when tested using ASTM standard method number D 1876-72-"Standard Test Method for Peel Resistance of Adhesives (T-Peel Test)", the disclosure of which is incorporated herein by reference. The following set up conditions should be used with respect to this test:

Test Specimen:
　Use a test specimen width of 3 inches (7.62 cm) instead of 1 inch (2.54 cm).
　Cut the test specimen in a direction that is generally perpendicular to the orientation of the integrity maintenance zone 50.
　Insure the test specimen is free from any folds, perforations, and the like that may lead to erroneous peel strength results.
　Use a 1.5 inch (3.81 cm) prepeel instead of the 3 inch (7.62 cm) unbonded end described in the ASTM method.
　Test peel length: 6 inches (15.24 cm) instead of 5 inches (12.7 cm)
　Head speed: 20 inches per minute (50.8 cm per minute) instead of 10 inches per minute (25.4 cm per minute)
　Number of test specimens per sample: 4 instead of 10
　Report peel strength in grams per inch (grams per centimeter)

The Applicants have found that the peel strength for integrity attachment means 24 should be at least 10 grams per inch (4 grams per centimeter). Preferably, the peel strength is at least about 30 grams per inch (12 grams per centimeter) and, more preferably, the peel strength is greater than the tensile strength of an individual lamina 20T or 20B so that one of the laminae fails in tension rather than the attachment means 24 failing.

Similarly, the peel strength in separation zone 52 must have a minimum value. If it does not, the laminated paper product 20 will lack sufficient integrity for good performance when it is used in its unseparated state. On the other hand, the peel strength in the separation zone 52 should not be too close to the peel strength in the integrity maintenance zone 50. If the peel strength in the separation zone 52 and the peel strength in the integrity maintenance zone 50 are too close users may have difficulty in reliably manipulating the laminated paper product 20 from its unseparated state to its separated state. The Applicants have found that the peel strength in the separation zone 52 should be at least about 1.5 grams/inch (0.6 grams/cm) for integrity maintenance, but no greater than about 3.5 grams/inch (1.4 grams/cm) because peel strengths greater than about 3.5 grams/inch (1.4 grams/cm) in the separation zone 52 makes separating the laminae 20T, 20B unacceptably difficult. Preferably, the peel strength in separation zone 52 is between about 2.0 grams/inch (0.8 grams/cm) and about 3.0 grams/inch (1.2 grams/cm). More preferably, the peel strength in separation zone 52 is about 2.5 grams/inch (1.0 grams/cm).

The ratio of the peel strength in the integrity maintenance zone 50 to the peel strength in the separation zone 52 is also important. If the ratio is too low, a user, who is manipulating the laminated paper product 20 from its unseparated state to its separated state, will not receive a tactile signal when the line of separation passes from separation zone 52 into integrity maintenance zone 50. If the signal is insufficient a user could completely separate the laminated paper product and be left with the two laminae 20T and 20B, which, while having some utility, would have less utility than the laminated paper product 20 in its separated state. The Applicants have found that the ratio of the peel strength in the integrity maintenance zone 50 to the peel strength in the separation zone 52 should be at least about 3:1. Preferably, the ratio should be at least about 10:1 and, more preferably, the ratio should be at least about 100:1.

Integrity attachment means 24 and peelable attachment means 26 can comprise any means of joining two lamina of paper that are known in the art. For example, integrity attachment means 24 and peelable attachment means 26 can both comprise an adhesive or two different adhesives. Alternatively, integrity attachment means 24 can comprise an adhesive and peelable attachment means 26 comprise a mechanical interlocking of the lamina, for example by knurling or interlocking of the embossments.

In the preferred embodiment of the laminated absorbent article 20 shown in FIGS. 1–3, integrity attachment means 24 and peelable attachment means 26 use the same adhesive material. A suitable adhesive for use in the preferred embodiment of the laminated paper product 20 is Elvanol 71-30G polyvinyl alcohol available from E. I. DuPont DeNemours & Co., Wilmington, Del. One skilled in the art, using the desired peel strength and the tensile properties of the lamina 20T and 20B can determine appropriate adhesive solids levels to provide the desired peel strength to each of the integrity maintenance zone 50 and the separation zone 52. Alternatively, an adhesive formulation having a single solids level could be used and differing amounts could be applied to integrity maintenance zone 50 and the separation zone 52. For example, an engraved roll having cell patterns (i.e. cell density or cell volume) suitable for delivering an appropriate volume of adhesive solution to each of integrity maintenance zone 50 and separation zone 52 could be used for this purpose. Other adhesive means such as hot melt adhesives that can be applied by either spraying or by printing means are also suitable.

The laminated paper product 20 of the present invention further comprises a starting zone 54. A user can initiate the separation of laminae 20T and 20B by grasping one of the individual laminae 20T or 20B in the starting zone 54 between the thumb and forefinger of his/her right hand and the other lamina 20B or 20T in the starting zone 54 between the thumb and forefinger of his/her left hand and gently pulling the lamina apart. In other words, the starting zone 54 enables a user to manipulate the laminated paper product from its unseparated state to its separated state.

The structure of the starting zone 54 is most clearly shown in FIG. 3. As can be seen in FIG. 3, lamina 20T and 20B are not joined in the starting zone 54, at least in the row of embossed sites that is adjacent the second longitudinal edge 55. The number of rows of embossed sites 22 wherein the laminae are not joined will depend on the pattern chosen for the embossed sites 22 and the desired width of the starting zone 54. The starting zone 54 need only be as wide as is necessary for a user to reliably grip each individual lamina 20T and 20B for separating the lamina. In preferred embodiments of the present invention the starting zone 54 is less than about 0.75 inches (1.91 cm) and greater than about 0.25 inches (0.64 cm) wide. Preferably, the starting zone 54 is about 0.5 inches (1.27 cm) wide.

In a particularly preferred embodiment the laminated paper product 20 further comprises a laminated web 30 that is supplied to a user wound on a roll. The web 30 is further divided into individual sheets 35 by lines of weakness 37. This particularly preferred embodiment is shown in FIG. 4.

To use the particularly preferred embodiment of the present invention shown in FIG. 4, a user would grasp the web on each side of that line of weakness 37 which determines the number of sheets 35 the user desires to dispense from the web. The sheets 35 can then readily be disassociated from the web 30 by pulling along the line of weakness 37. Once the sheets 35 have been disassociated from the web they can be used as desired. For example, the disassociated sheets 35 can be used in their joined state for tasks, such as spill wipe up, typically performed using paper toweling. Alternatively, the disassociated sheets 35 can be used in their separated state for area coverage tasks, such as lap protection, for which a paper napkin is typically used.

The line of weakness 37 can be provided by means readily apparent to those skilled in the art. For example, the web 30 can be provided with a perforation pattern wherein the land areas of the perforation pattern join individual sheets 35 into web 30. It is well known in the art that, when the web 30 is grasped and pulled as described hereinabove, the web will preferentially tear along the land areas of the perforation pattern. Other means of providing a line of weakness 37, such as score lines or laser cut lines are also contemplated.

While, in the preferred embodiment of the present invention discussed above, there is a substantial change in peel strength between the separation zone 52 and the integrity maintenance zone 50, other embodiments of the present invention are also contemplated. For example, the peel strength of the attachment means joining the lamina 20T and 20B could increase laterally across the laminated paper product 20 starting with no peel strength at a location adjacent the second longitudinal edge 55 (equivalent to starting zone 54) to a maximum adjacent the first longitudinal edge 51 Such an increase could be described by a linear function of the lateral position, an exponential function of the lateral position, or any other function as desired.

FIGS. 5 and 5a show an embossing/lamination apparatus 100 that can be used to produce the laminated paper product 20 of the present invention. Referring to FIGS. 5 and 5a, in the embossing/lamination apparatus 100 according to the present invention, two pressure rolls 115T and 115B and two pattern rolls 110T and 110B are juxtaposed with parallel axes to form three nips. The protuberances 130 of each pattern roll 110T and 110B are not registered at the nip with the protuberances of the opposing pattern roll 110B or 110T, as occurs in the knob-to-knob embossing apparatus (see, for example, the above-referenced U.S. Pat. No. 3,414,459). Instead, the protuberances 130 of each pattern roll 110B or 110T at the nip are intermediate the protuberances 130 of the other pattern roll 110T or 110B.

Significantly, however, the distal end 131 of each protuberance 130, as illustrated in FIG. 5a, contacts the periphery 135 of the other pattern roll 110T or 110B intermediate the proximal ends of the protuberances 130 of the other pattern roll 110B or 110T. This arrangement requires not only that each protuberance 130 radially extend the same distance from the periphery of its respective pattern roll 110T or 110B, but also that the periphery 135 of the pattern rolls 110T or 110B at the proximal ends of the protuberances 130 be straight and of constant diameter. A method to insure the above-mentioned constant radial extensions and diameters is further described in U.S. Pat. No. 5,294,475 entitled "Dual Ply Cellulosic Fiber Structure Laminate" issued to McNeil on Mar. 15, 1994, the disclosure of which is incorporated herein by reference.

In this arrangement, an embossed site 22 is formed between the top pattern roll 110T and the top pressure roll 115T at each protuberance 130 on the top pattern roll 110T. Likewise, an embossed site 22 is formed between the bottom pattern roll 110B and the bottom pressure roll 115B at each protuberance 130 on the bottom pattern roll 110B.

In this arrangement, each lamina 20T or 20B is joined to the other lamina 20B or 20T at the nip between the two pattern rolls 110T and 110B. The protuberances 130 of each pattern roll 110B or 110T deflect the distal ends 23 of the respective embossed sites 22 to the midpoint of the span of the nonembossed region 25 of the other lamina 20T or 20B. In the finished product, each embossed site 22 is adhesively joined to the other lamina 20T or 20B at this midpoint, by the interposition of the laminae 20T and 20B between the protuberances 130 of the pattern rolls 110T and 110B and the periphery 135 of the proximal ends of the protuberances of the other pattern roll 110T or 110B.

After the embossed sites 22 are formed between the pattern roll 110T or 110B and the pressure roll 115T or 115B, the embossed sites 22 of each lamina 20T or 20B are coated with adhesive from the respective adhesive applicator rolls 120T and 120B. Only the embossed sites 22 which extend radially outwardly beyond the nonembossed region 25 of the laminae 20T and 20B are adhesive coated, because these are the only areas of the laminae 20T and 20B which contact the adhesive applicator rolls 120T and 120B. Adhesive joining between the laminae 20T and 20B occurs at each embossed site 22, because the application of the adhesive and the compression of that lamina 20T or 20B against the other lamina 20B or 20T occurs coincident with the application of the adhesive—at the embossed sites 22.

As is shown in FIG. 6, the adhesive applicator rolls 120T and 120B are provided with discrete zones 150, 152, and 154 wherein the level of applied adhesive differs according to the peel strength requirements of the corresponding zones 50, 52, and 54 of the laminated paper product 20. That is, adhesive is applied to integrity maintenance zone 50 of laminated paper product 20 by the adhesive applicator rolls 120T and 120B in applicator integrity zone 150 at a level that insures the peel strength requirements for integrity maintenance zone 50 of the laminated paper product 20 discussed hereinabove are satisfied. Similarly, the adhesive applicator rolls 120T and 120B in applicator separation zone 152 apply the appropriate amount of adhesive to separation zone 52 of laminated paper product 20. As is obvious from the description of starting zone 54 hereinabove, the adhesive applicator rolls 120T and 120B apply no adhesive to laminae 20T and 20B in applicator starting zone 154.

Appropriate levels of adhesive can be delivered by the various zones of adhesive applicator rolls 120T and 120B in several manners. Applicator rolls 120T and 120B can be transfer rolls which delivers adhesive to the embossed sites 22 from individual engraved or anilox rolls (not shown) for each of zones 150 and 152 wherein the individual engraved or anilox rolls have cell volumes such that the appropriate amount of adhesive is applied to the applicator rolls so the peel strength requirements for the corresponding zone of laminated paper product are met.

Preferably, adhesive applicator rolls 120T and 120B are engraved or anilox rolls. Most preferably, adhesive applicator rolls 120T and 120B have separate adhesive supply sources for the adhesive to be applied in applicator integrity zone 150 and the adhesive to be applied in applicator separation zone 152. Alternatively, each applicator roll 120T and 120B has a single adhesive supply source and the rolls are engraved such that applicator integrity zone 150 delivers more adhesive to the embossed sites 22 in integrity maintenance zone 50 of laminated paper product 20 than applicator separation zone 152 delivers to the embossed sites 22 in separation zone 52 of laminated paper product 20.

If desired, one of the adhesive applicator rolls 120T or 120B may be omitted, providing for adhesive to be present on the embossed sites 22 originating from only one of the laminae 22T or 22B. The resulting cellulosic fibrous structure 20 has both embossed sites 22 which are adhesively joined to both laminae 20T and 20B and embossed sites 22 which are not adhesively joined to the other lamina 20T or 20B.

When using the apparatus of the present invention, it is desired that the adhesive joining of the laminae 20T and 20B occurs while each embossed site 22 is at the maximum deformation across protuberances 130. By adhesively locking the laminae 20T and 20B into place coincident the maximum deformation of the embossed sites 22, a more quilted appearance and feel is created in the nonembossed region 25 intermediate the embossed sites 22.

As noted hereinabove, alternative means of applying adhesive to join laminae 20T and 20B are also contemplated. For example, a stripe of hot melt adhesive, as described in U.S. Pat. No. 5,143,776 entitled "Tissue Laminates Having Adhesively Joined Tissue Laminae" issued to Givens on Sep. 1, 1992 (the disclosure of this patent being incorporated herein by reference) can be used to join laminae 20T and 20B in integrity maintenance zone 50 of laminated paper product 20. It is further contemplated that a plurality of nozzles, such as those described in the above-referenced Givens patent, that are dispersed laterally across the transverse width of one of the laminae 20T or 20B could, by varying the amount of adhesive delivered to the laminae depending on the lateral location of the nozzle provide the appropriate amount of adhesive to both the integrity maintenance zone 50 and the separation zone 52 of the laminated paper product 20.

The disclosures of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A laminated paper product useful as toweling, toilet tissue, napkins, the paper product having at least a pair of edges and comprising:

a plurality of laminae of paper, each of said laminae having at least one surface being opposed to a surface of another lamina;

each of said opposed surfaces being divided into at least two portions, said portions of opposed surfaces being joined to form a laminate of said lamina, wherein at least one of said joined portions is joined using a laminating adhesive, each of said opposed surfaces also having a portion wherein said opposed surfaces are unjoined;

each of said joined portions also having a peel strength that is at least about 1.5 grams/inch (0.6 grams/centimeter), wherein one of said peel strengths is at least about 10 grams/inch (4 grams/centimeter) and is greater than the remainder of said peel strengths, the ratio between said greater peel strength and the remainder of said peel strength being at least about 3:1, and said portion having said greater peel strength lies adjacent one of said pair of edges and said portion where said opposed surfaces are unjoined lies adjacent the other of said edges with the remainder of said joined portions lying therebetween.

2. The laminated paper product of claim 1 wherein said joined portion with said greater peel strength is joined using a laminating adhesive at a first level and said remaining joined portions are joined using a laminating adhesive at different levels; wherein said first level is greater than said different levels.

3. The laminated paper product of claim 1 wherein said joined portion with said higher peel strength is joined using a first laminating adhesive and said remaining joined portions are joined using a second laminating adhesive; wherein said first laminating adhesive has a peel strength greater than said second laminating adhesive.

4. The laminated paper product of claim 1 wherein said joined portion with said greater peel strength is joined using a laminating adhesive and said remaining joined portions are joined using interlocking embossments.

5. A laminated paper product useful a toweling, toilet tissue, napkins, said paper product having opposed first and second longitudinal edges and comprising:

two lamina of tissue paper;

each of said laminae having a surface opposed to a surface of the other lamina;

said opposed surfaces being joined to form a laminate, wherein:

each of said opposed surfaces is divided into first, second, and third portions, said first portion of one of said opposed surfaces being joined to said first portion of the other of said opposed surfaces using a laminating adhesive so as to have a peel strength of at least about 10 grams/inch (4 grams/centimeter) to form an integrity maintenance zone, wherein said integrity maintenance zone lies adjacent said first longitudinal edge, said third portion forms a starting zone and lies adjacent said second longitudinal edge, wherein said laminae are not joined in said starting zone, said second portion of each of said opposed surfaces being joined using a laminating adhesive so as to have a peel strength of at least about 1.5 grams/inch (0.6 grams/centimeter) to form a separation zone which lies between said integrity maintenance zone and said starting zone, wherein the ratio of said peel strength in said integrity maintenance zone to said peel strength in said separation zone is at least about 3:1;

said laminate further being a web that is wound into a roll for dispensing by a user, wherein said web can be separated into individual sheets along lines of weakness in said web.

6. The laminated paper product of claim 5 wherein said integrity maintenance zone is formed using a first laminating adhesive and said separation zone is formed using a second laminating adhesive.

7. A laminated paper product useful as toweling, toilet tissue, napkins, said paper product comprising:

two lamina of tissue paper;

each of said laminae having first and second opposed longitudinal edges and a surface opposed to a surface of the other lamina;

said opposed surfaces being joined to form a laminate, wherein said laminate has a peel strength wherein said peel strength is about 10 grams/inch (4 grams/centimeter) adjacent said first longitudinal edge and negligible adjacent said second longitudinal edge, said peel strength increasing with lateral position between said second and first longitudinal edges.

* * * * *